(12) United States Patent
Yamauchi

(10) Patent No.: US 8,307,189 B2
(45) Date of Patent: Nov. 6, 2012

(54) INFORMATION PROCESSING APPARATUS AND SEMICONDUCTOR STORAGE DEVICE

(75) Inventor: Satoshi Yamauchi, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 164 days.

(21) Appl. No.: 12/840,193

(22) Filed: Jul. 20, 2010

(65) Prior Publication Data

US 2011/0078390 A1    Mar. 31, 2011

(30) Foreign Application Priority Data

Sep. 30, 2009  (JP) ................................ 2009-228933

(51) Int. Cl.
*G06F 12/00* (2006.01)
(52) U.S. Cl. ....................... 711/173; 711/165
(58) Field of Classification Search .................. 711/165, 711/173
See application file for complete search history.

(56) References Cited

U.S. PATENT DOCUMENTS

| | | | | |
|---|---|---|---|---|
| 7,710,777 B1 * | 5/2010 | Montierth et al. | ....... | 365/185.09 |
| 2009/0193174 A1 * | 7/2009 | Reid | .............................. | 711/100 |
| 2009/0216936 A1 * | 8/2009 | Chu et al. | ...................... | 711/103 |

FOREIGN PATENT DOCUMENTS

| | | |
|---|---|---|
| JP | 04-332999 | 11/1992 |
| JP | 11-003287 | 1/1999 |
| JP | 2007-172447 | 7/2007 |

* cited by examiner

*Primary Examiner* — Jared Rutz
*Assistant Examiner* — Gurtej Bansal
(74) *Attorney, Agent, or Firm* — Knobbe Martens Olson & Bear LLP

(57) ABSTRACT

An information processing apparatus includes: a processor configured to perform a computation processing; a storage device configured to store first data in a first number of physical blocks and store second data in a second number of physical blocks, wherein the second data are read more frequently than the first data, and the second number is larger than the first number; and a read control module configured to read the second data from the storage device and send the second data to the processor, wherein when the processor reads the second data N times as much as the second number, N being a positive integer, the same number of the second data are read from each of the second number of physical blocks.

7 Claims, 5 Drawing Sheets

| LOGICAL ADDRESS | NO. | READ FLAG | PHYSICAL BLOCK TO BE USED |
|---|---|---|---|
| ADDRESS A | 1 | 1 | a |
| ADDRESS B | 1 | 0 | b |
| | 2 | 1 | c |
| | 3 | 0 | d |
| | 4 | 0 | e |
| ADDRESS C | 1 | 1 | f |
| | 2 | 0 | g |
| ADDRESS D | 1 | 0 | h |
| | 2 | 0 | i |
| | 3 | 1 | j |
| ADDRESS E | 1 | 0 | k |
| | 2 | 1 | l |

INFORMATION PROCESSING APPARATUS AND SEMICONDUCTOR STORAGE DEVICE

CROSS-REFERENCE TO RELATED APPLICATION

This application claims priority from Japanese Patent Application No. 2009-228933, filed on Sep. 30, 2009, the entire contents of which are hereby incorporated by reference.

BACKGROUND

1. Field

One embodiment of the invention relates to an information processing apparatus, a semiconductor storage device, and a reading control method. For example, one embodiment of the invention relates to an information processing apparatus, which contribute to elongation of the life of a semiconductor storage device, as well as to a semiconductor storage device which is elongated in life.

2. Description of the Related Art

In recent years, with the development of technologies relating to storage devices, the life of storage devices such as semiconductor storage devices has been elongated.

For example, a wear leveling technique has been used which is a technique for elongating the life of semiconductor storage devices such as a NAND flash memory which deteriorate as the number of times of access increases.

For example, a flash memory employs a wear leveling technique in which the number of times of writing of each storage block is measured and, when the number of times of writing performed on a certain storage block has been reached a limit number, the write destination is changed to another storage block (see e.g., JP-A-2007-172447).

However, the common wear leveling technique that is employed in the above flash memory, for example, cannot be applied to life elongation in a case that data access for only reading occurs.

Furthermore, in semiconductor storage devices, the processing speed of read processing is higher than that of write processing. If the ordinary wear leveling technique is applied to the read processing, in many cases, the frequency of execution of processing of counting the number of times of writing is increased. The processing speed is thus decreased to a large extent.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION OF EXEMPLARY EMBODIMENTS

Exemplary embodiments of the present invention will be hereinafter described with reference to the drawings.

First Embodiment

Figure 1:
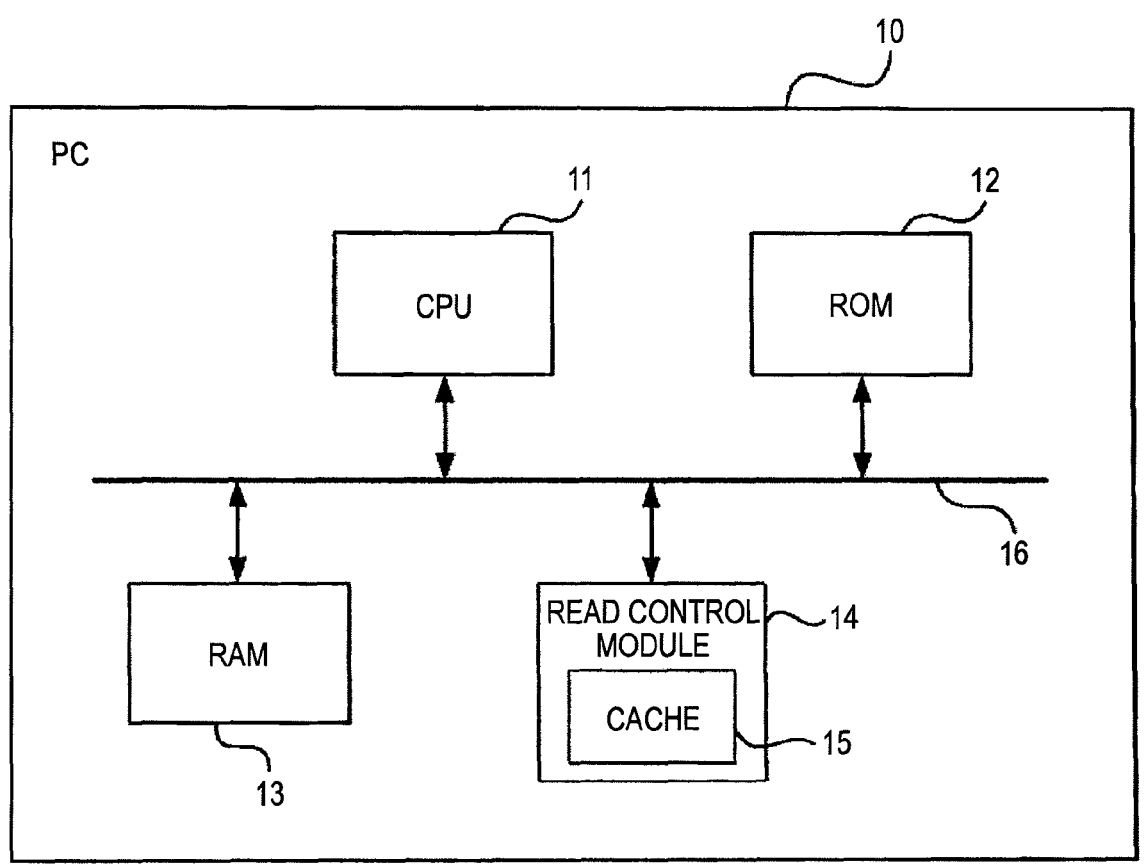
FIG. 1 is a block diagram showing an example internal configuration of a PC which is an information processing apparatus according to a first embodiment of the invention.

FIG. 1 is a block diagram showing an example internal configuration of a personal computer (PC) 10 which is an example information processing apparatus according to a first embodiment of the invention. As shown in FIG. 1, the PC 10 includes a CPU 11, a ROM 12, a RAM 13, a read control module 14 which incorporates a cache 15, and a bus 16.

The PC 10 has a function of performing various kinds of computation processing. Although the embodiment is directed to the PC, the invention is not limited to it and may be applied to various electronic apparatus such as a digital TV receiver, a cell phone, and household electrical appliances incorporating a microcomputer.

The CPU (central processing unit) 11 controls the entire PC 10. The CPU 11 has a function of running a program and performing prescribed processing according to the program. Furthermore, the CPU 11 can read information from various storage media and write information to the various storage media.

The ROM (read-only memory) 12 is a nonvolatile semiconductor storage device such as a NAND flash memory. In the embodiment, the ROM 12 is stored with data that are used by the CPU 11 when the PC 10 is booted or the CPU 11 runs various programs.

The RAM (random access memory) 13 is a volatile semiconductor storage device such as an SDRAM on which address-designated random reading can be performed. The RAM 13 is used as, for example, a data development area when the CPU 11 performs various kinds of information processing.

The read control module 14 is a semiconductor chip which controls the CPU 11's reading prescribed data from the ROM 12. The read control module 14 has a function of reading data (that the CPU 11 is going to read) from a physical block of the ROM 12 on the basis of a logical address of the data and sending the read-out data to the CPU 11.

The cache 15 is a semiconductor memory as part of the read control module 14, and is stored with table data called a read management table. The read control module 14 reads data from the ROM 12 by referring to the read management table.

The bus 16 is configured to connect the individual modules in such a manner that they can communicate with each other.

Figure 2:
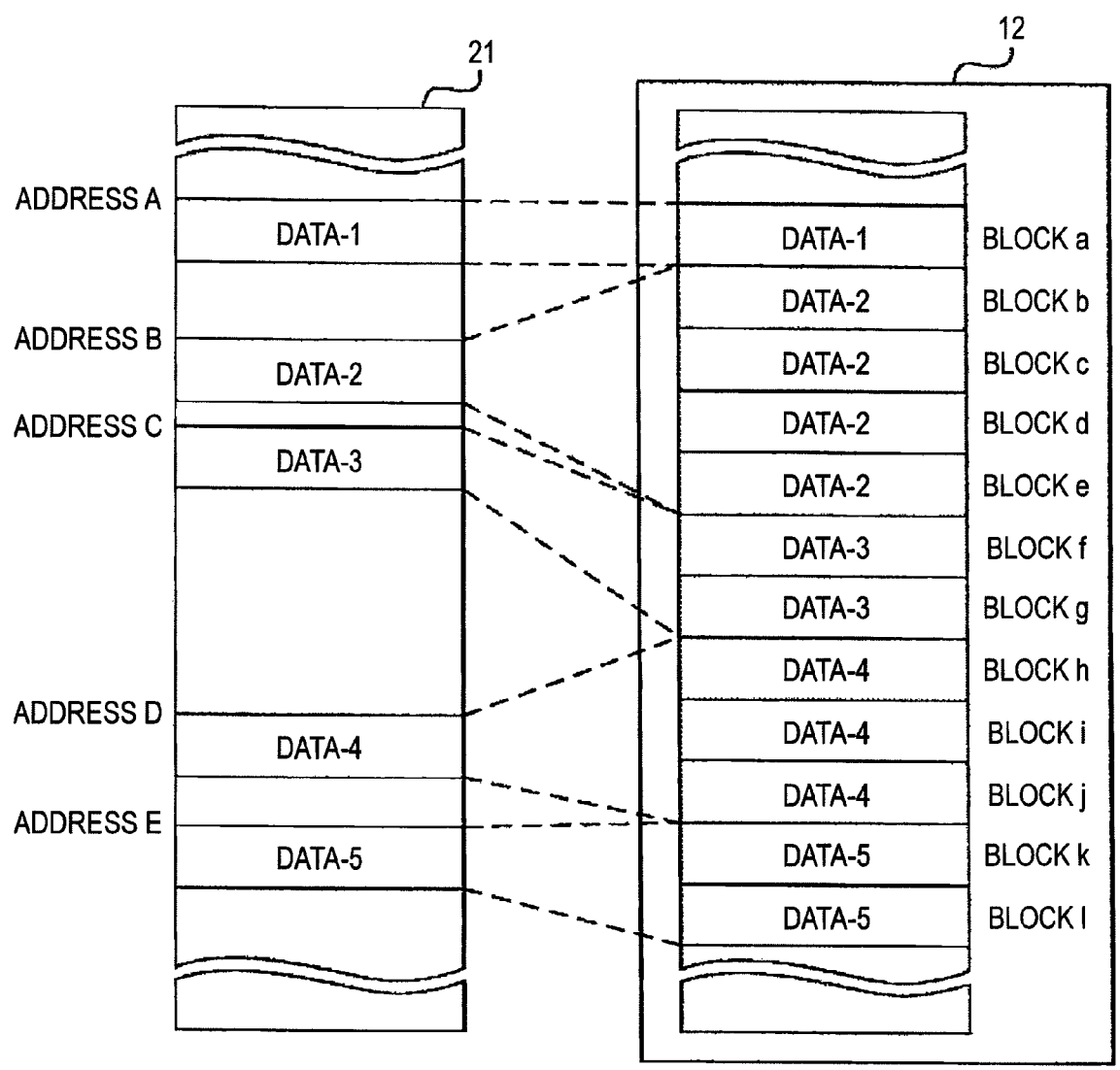
FIG. 2 shows an example manner of allocation of physical blocks of a ROM to logical addresses in the first embodiment.

FIG. 2 shows an example manner of allocation of physical blocks of the ROM 12 to logical addresses in an address space 21 in the embodiment.

The address space 21 is a virtual space to which the CPU 11 accesses in reading data and whose logical addresses are assigned to data that are stored in the ROM 12. That is, logical addresses of the address space 21 correspond to physical blocks of the ROM 12 in which individual data are stored. In the example of FIG. 2, in the address space 21, data-1 is handled as being stored starting from a logical address A and data-2 is handled as being stored starting from a logical address B. Likewise, as shown in FIG. 2, each of data-3 to data-5 is assigned logical addresses in the address space 21.

The ROM 12 has plural physical blocks a-l where data are stored actually. In the embodiment, the read control module 14 reads data from the ROM 12 by accessing each physical block.

An example read operation involving data-1 to data-5, which are found in advance to be different in the frequency of use, will be described below. Each of data-1 to data-5 has such a size as to be stored in a single physical block of the ROM 12.

Data-1 is the lowest in the expected frequency of reading among data-1 to data-5. Data-2 is expected to be subjected to reading approximately at four times as high a rate as data-1. Each of data-3 and data-5 is approximately two times as high in the frequency of reading as data-1, and data-4 is approximately three times as high in the frequency of reading as data-1.

In the ROM 12, data-1 to data-5 are actually stored in physical blocks a-l in the manner shown in FIG. 2. For example, data-1 is stored in only one physical block a. The same data-2 is stored in the four physical blocks b-e. In this manner, in the embodiment, data that is lower in the expected frequency of reading is stored in fewer physical blocks (i.e., data that is higher in the expected frequency of reading is stored in more physical blocks).

If the number of times of read access to a physical block exceeds a limit number, that physical block would be damaged and no data could be read from it any more. In view of this, in the PC 10 according to the embodiment, for data having a high expected frequency of reading, the same data is stored in plural physical blocks in the same manner. The data is read from the plural physical blocks in order (not from a single physical block every time), whereby the frequency of use of each physical block is made lower as compared with the number of times data are read from the respective physical blocks. As a result, the time to breakage of each physical block can be increased and the life of the ROM 12 which is a semiconductor storage device can be elongated.

In the embodiment, the number of physical blocks assigned for storage of each data is set according to the expected frequency of use of each data. For example, since data-2 is approximately four times as high in the expected frequency of use as data-1, the four physical blocks b-e are assigned to data-2 whereas only one physical block a is assigned to data-1. In this manner, in the embodiment, if second data is approximately N times as high in the expected frequency of use as first data, the second data is assigned, for data storage, N times as many physical blocks as the first data (the same second data is stored in N times as many physical blocks). With this measure, the frequencies of use of the physical blocks are made approximately the same (smoothed out). This lowers the probability of occurrence of an event that a particular physical block is damaged first and the entire ROM 12 can no longer be used though the other physical blocks are usable. That is, each physical block can be used close to its life end and the life of the ROM 12 as a whole can be elongated.

FIG. 2 is drawn in such a manner that the physical blocks a-l of the ROM 12 in which data-1 to data-5 are stored are continuous (adjacent to each other). However, those physical blocks a-l need not be continuous (may be continuous).

A relationship between read access to a logical address of the address space 21 by the CPU 11 and read access to a physical block of the ROM 12 by the read control module 14 will be described below with reference to FIG. 3.

Figure 3:
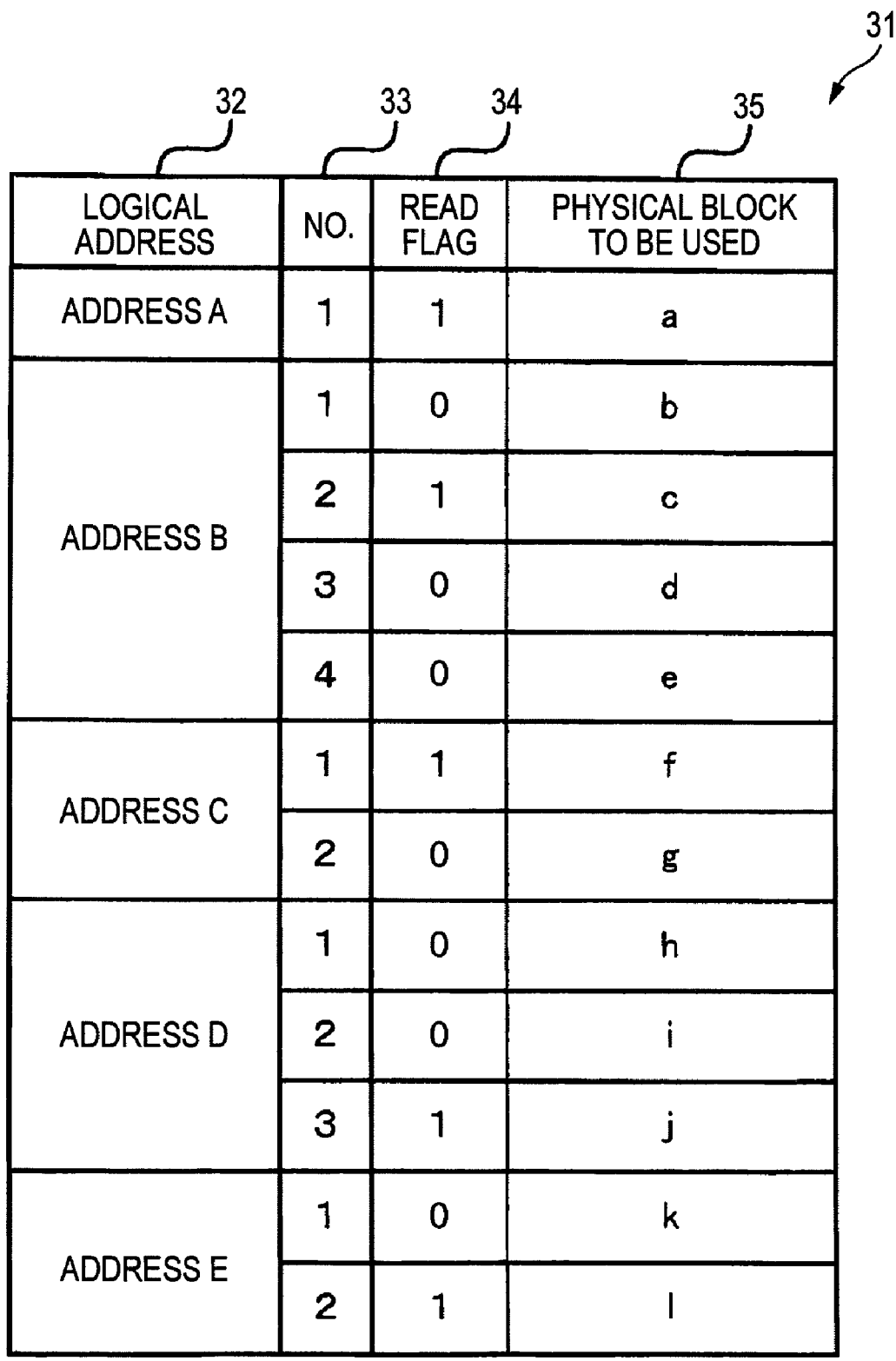
FIG. 3 shows an example read management table used in the first embodiment.

FIG. 3 shows an example read management table 31 used in the embodiment.

The read management table 31 shown in FIG. 3 is stored in the cache 15. When the CPU 11 makes read access to a logical address of the address space 21, the read control module 14 makes read access to a physical block of the ROM 12 by referring to the read management table 31.

Columns "logical address 32," "number 33," "read flag 34," and "physical block 35 to be used" are arranged in the read management table 31.

In the column "number 33," numbers starting from 1 are arranged in ascending order for each logical address which corresponds to one or plural physical blocks. Read flags are set on the column "read flag 34" to indicate physical blocks to be used when the CPU 11 reads out data next time. That is, a numerical value "1" or "0" is shown in each box on the column "read flag 34." The value "1" indicates that the corresponding physical block is to be subjected to reading, and the value "0" indicates that the corresponding physical block is not to be subjected to reading. The physical blocks to be used actually when the CPU 11 reads out data are shown on the column "physical block 35 to be used."

When the CPU 11 makes read access to a logical address in the address space 21, the read control module 14 acquires the logical address and collates it with the entries on the column "logical address 32" of the read management table 31. When finding, in the column "logical address 32," the logical address to which the CPU 11 is making read access, the read control module 14 then finds, from rows corresponding to the logical address concerned, a row on which a read flag is set (value "1" is shown) in the box on the column "read flag 34" and reads data from the box on the same row and on the column "physical block 35 to be used." The read control module 14 sends the read-out data to the CPU 11.

For example, to read data-2, the CPU 11 makes read access to address B in the address space 21 where data-2 is assumed be stored. The read control module 14 acquires information of address B (read destination logical address) and detects address B from the column "logical address 32" of the read management table 31. Then, the read control module 14 determines a number shown on the same row as a read flag is set from numbers "1" to "4" that correspond to address B. A read flag is set on the row having number "2" and the physical block c is found on the same row. Since the physical block c corresponds to number "2" that is on the same row as the read flag is set, the read control module 14 reads data-2 from the logical block c of the ROM 12 and sends it to the CPU 11. The CPU 11 can thus acquire data-2, that is, read subject data.

Figure 4:
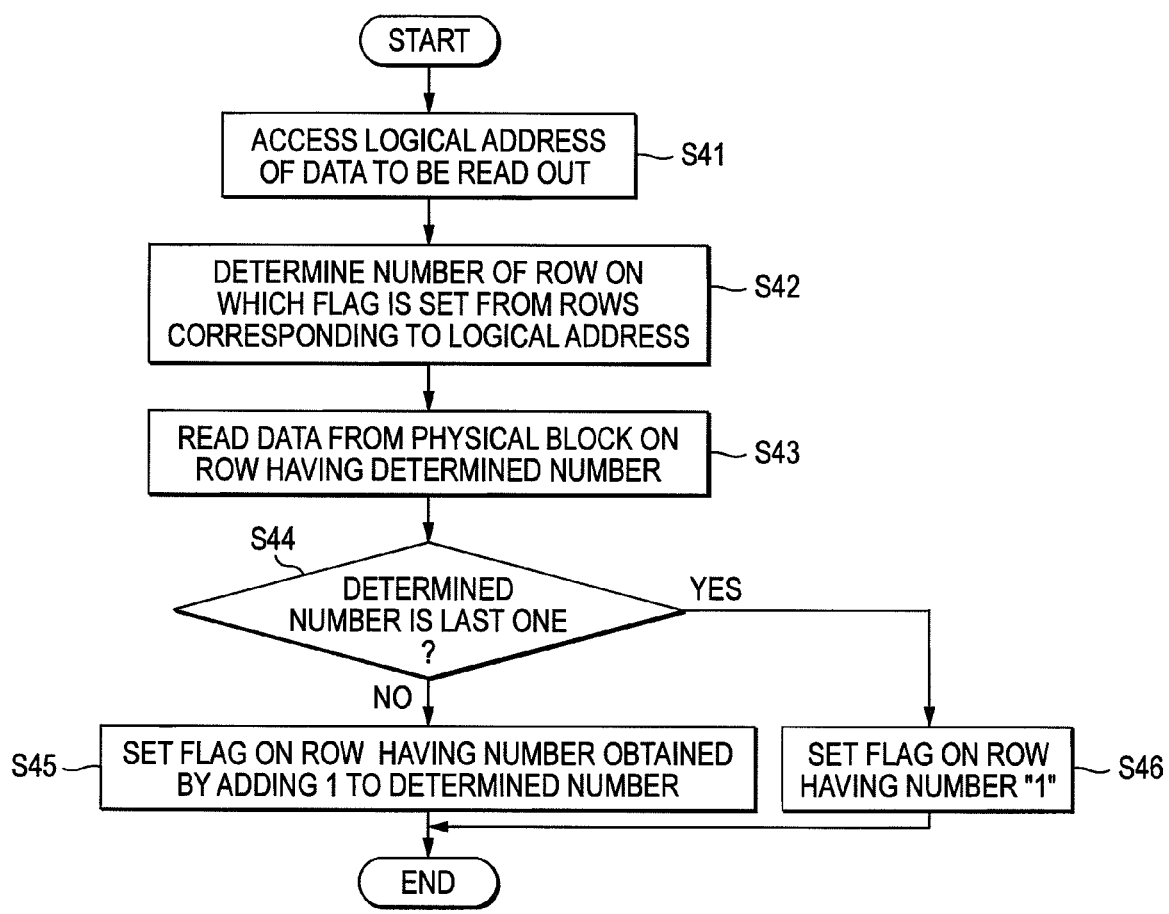
FIG. 4 is a flowchart of an example data reading process which is executed by the PC according to the first embodiment.

FIG. 4 is a flowchart of an example data reading process which is executed by the PC 10 according to the embodiment.

To read data from the ROM 12, first, at step S41, the CPU 11 makes read access to a logical address in the address space 21 where the data is assumed be stored.

At step S42, the read control module 14 acquires information of the logical address accessed by the CPU 11, detects rows corresponding to the logical address in the read management table 31 which is stored in the cache 15, and determines a row on which a read flag is set from the detected rows and also determines a number shown on that row.

At step S43, the read control module 14 reads data from the physical block of the ROM 12 that is shown in the box on the row having the determined number and on the column "physical block 35 to be used" and sends the read-out data to the CPU 11.

After reading the data from the ROM 12, at step S44 the read control module 14 determines whether or not the number that was determined at step S42 is the last one among the numbers assigned to the corresponding logical address. For example, in the case of the read management table 31 of FIG. 3, to read data-2 whose logical address is address B, the read control module 14 reads data-2 from the physical block c of the ROM 12 and sends it to the CPU 11. Then, since the number shown on the same row as a read flag is set is "2" which is different from the last number "4" among the numbers corresponding to address B, the read control module 14 determines that determined number is not the last one.

If determining that the number of the row on which the read flag is set is not the last one (S44: no), at step S45 the read control module 14 erases the flag (changes the value from "1" to "0") from the box on the flag-set row and on the column "read flag 34" and sets a flag (changes the value from "0" to "1") in the box on the row having the next number and on the column "read flag 34." That is, the read control module 14 changes the number of the flag-set row to a number obtained by adding 1 to the determined number.

If determining that the number of the row on which the read flag is set is the last one (S44: yes), at step S46 the read control module 14 erases the flag (changes the value from "1" to "0") from the box on the flag-set row and on the column "read flag 34" and sets a flag (changes the value from "0" to "1") in the box on the row having number "1" and on the column "read flag 34."

Upon execution of step S45 or S46, the data reading process according to the embodiment is finished.

In the embodiment, physical blocks stored with the same data are used in order. If the same data is read once from every physical block, the data reading physical block returns to the first physical block and the data is again read from the physical blocks in order. With this procedure, physical blocks that are stored with the same data can be used almost uniformly, that is, the frequencies of use of the physical blocks can be made approximately identical. Furthermore, since data having different expected frequencies of use are assigned different numbers of physical blocks according to their respective expected frequencies of use, the frequencies of use of all physical blocks for storing data to be read out of the ROM 12 can be smoothed out, whereby the life of the ROM 12 which is a semiconductor storage device can be elongated. Still further, in the embodiment, such processing as counting the numbers of times of reading is not necessary and hence the amount of processing is not increased much. The data reading from the ROM 12 can be performed while causing almost no reduction in processing speed.

In the embodiment, as for the order of reading of the same data from physical blocks, the physical block from which data-2, for example, is read out is changed in order of block b→block c→block d→block e→block b, that is, after data-2 is read from the last physical block e, it is again read from the first physical blocks b. However, the exemplary embodiment is not limited to such a case. The physical block from which data-2, for example, is read out may be changed in order of block b→block c→block d→block e→block e→block d→block c→block b, that is, after data-2 is read from the last physical block e, it may be read again from blocks e-b in the reverse order. As a further alternative, instead of changing the data reading physical block every time reading occurs, the data reading physical block may be changed every time reading has occurred a plural number of times. Furthermore, an index other than the number of times of reading may be used for triggering a change of the data reading physical block. An example is as follows. When the temperature of a physical block becomes too high, a temperature detector (temperature sensor) disposed around the ROM 12 detects the temperature increase. Thus, the data reading physical block is changed to another physical block.

In the embodiment, the read control module 14 sends the CPU 11 data that is read from the ROM 12. Alternatively, for example, read-out data may be stored directly in the RAM 13. The CPU 11 performs processing involving the data using the data stored in the RAM 13.

Furthermore, although in the embodiment the read control module 14 is a semiconductor chip that is independent of the other modules, the exemplary embodiment is not limited to such a case. For example, the bus 16, the ROM 12, or the CPU 11 may have the read control module 14. Where the CPU 11 has the read control module 14, the CPU 11 should make read access directly to the ROM 12 and read data from a physical block that is set for the data. Still further, the read control module 14 may be implemented as software.

(Modification)

A modification of the first embodiment will be described below with reference to FIG. 5.

Figure 5:
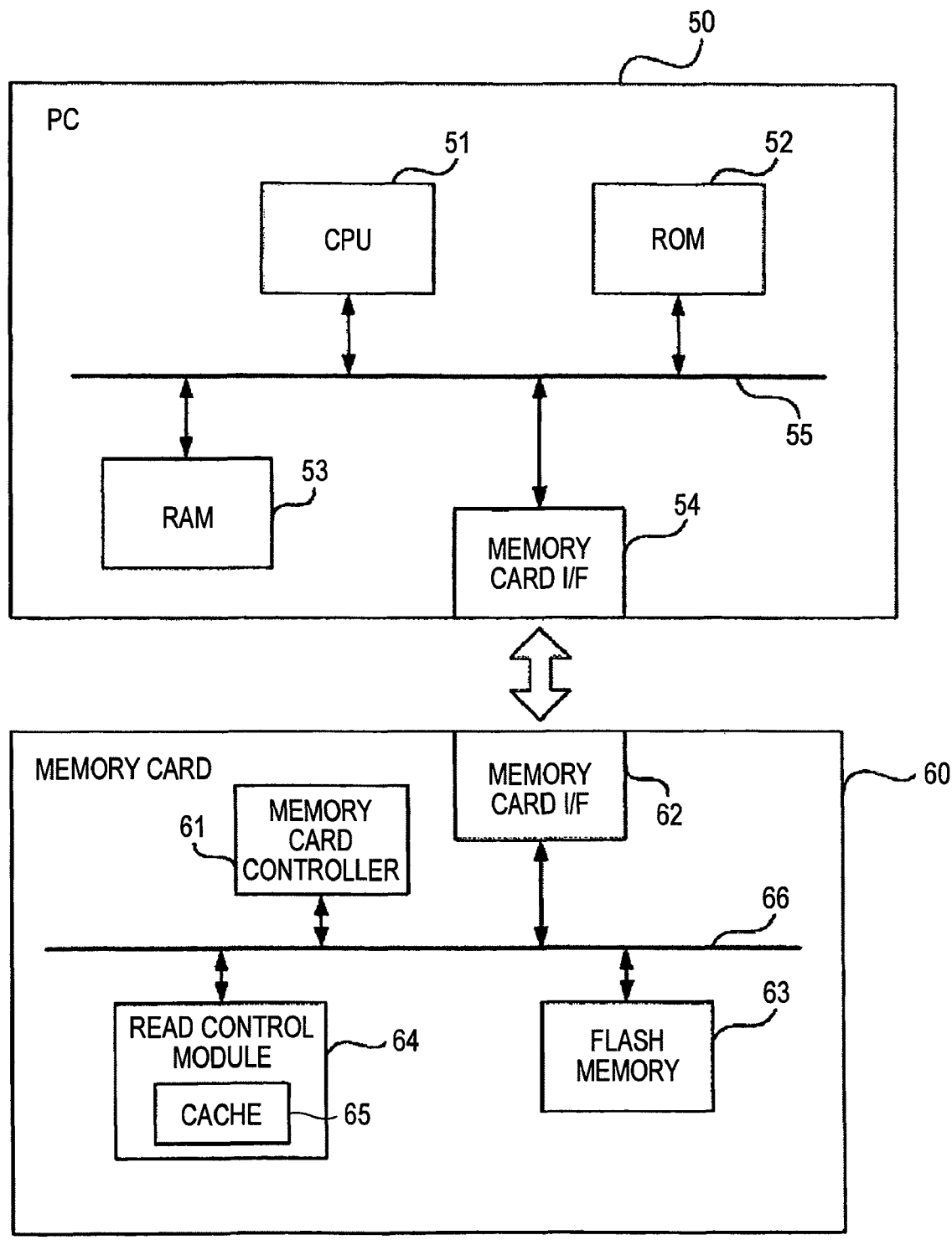
FIG. 5 is a block diagram showing example internal configurations of a PC and a memory card according to a modification of the first embodiment.

FIG. 5 is a block diagram showing example internal configurations of a PC 50 and a memory card 60 according to the modification.

Unlike the first embodiment, the modification is directed toward a case that a CPU 51 reads data from a flash memory 63 provided in the memory card 60 rather than from a ROM 52 provided in the PC 50.

The internal configuration of the PC 50 is different from that of the PC 10 according to the first embodiment in that the read control module 14 is removed and a memory card I/F 54 is added. The other module blocks have approximately the same functions as the corresponding ones in the first embodiment and hence will not be described redundantly.

The memory card I/F 54 is an interface for exchanging data with the memory card 60.

The memory card 60 is a semiconductor storage device such as an SD card from which data (stored in semiconductor elements) can be read when it is connected to the PC 50.

The memory card 60 is provided with a memory card controller 61 which is a semiconductor chip, for example. When the memory card 60 is connected to the PC 50 in a signal exchangeable manner, the memory card controller 61 controls the entire memory card 60.

The memory card 60 exchanges signals with the PC 50 using a memory card I/F 62 as an interface. The memory card I/F 62 exchanges signals with the memory card I/F 54 of the PC 50.

The flash memory 63 is a semiconductor memory and has the same configuration as the ROM 12 of the first embodiment (the flash memory 63 has plural physical blocks). The flash memory 63 is stored with data that can be used in the PC 50.

A read control module 64 and a cache 65 have the same functions as the read control module 14 and the cache 15 of the first embodiment, respectively.

The cache 65 is stored with a read management table. When receiving, from the PC 50, a request for reading data from the flash memory 63, as in the first embodiment the read control module 64 refers to the read management table, reads data from a physical block that is determined according to the read management table, and sends the read-out data to the PC 50.

A data reading process according to the modification is the same as the data reading process according to the first embodiment. In the modification, the read control module 64 (semiconductor chip) which is provided in the memory card 60 (i.e., outside the PC 50) executes the data reading process.

Although in the embodiment the data reading is managed in units of a physical block, the exemplary embodiment is not limited to such a case. For example, the data reading may be managed in units of a page (pages are obtained by subdividing a physical block). In this case, the same data is stored in plural pages. In the read management table, the column "physical block" is replaced of a column "page." In general, whereas erasure can only be performed in units of a physical block, reading and writing can be performed in units of a page. Therefore, where the exemplary embodiment employs the case that the data reading is managed in units of a page, the numbers of times of reading can be smoothed out in a more detailed manner because they correspond to respective pages. The life of a semiconductor storage device can thus be elongated more. Furthermore, since particular data (same data) is read from plural pages, the probability of occurrence of a read disturb phenomenon which is a phenomenon that data is damaged as a result of reading it many times from a particular page (or physical block) can further be reduced.

In the exemplary embodiment, data only for reading are assigned in sets of physical blocks of a semiconductor storage device according to their respective expected frequency of reading. As such, the exemplary embodiment can provide an information processing apparatus and a computer-readable medium which can elongate the life of a semiconductor storage device that is stored with data only for reading without lowering its processing speed, as well as a semiconductor storage device which is stored with data only for reading and is elongated in life without being virtually lowered in processing speed.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. An information processing apparatus comprising:
a processor;
a storage device comprising a plurality of physical blocks and configured to store first data in first physical blocks among the plurality of physical blocks and to store second data in second physical blocks among the plurality of physical blocks, wherein the second data are read from the storage device more frequently than the first data, and the number of the second physical blocks is larger than the number of the first physical blocks; and
a read controller configured to sequentially read the second data from each of the second physical blocks of the storage device and send the second data to the processor, wherein the read controller reads the second data evenly in terms of number of times the second data is read from each of the second physical blocks, when the read controller reads the second data $N_1$ times as many as the number of the second physical blocks, where $N_1$ is a positive integer.

2. The apparatus according to claim 1, further comprising:
a read management table comprising information indicating a target physical block from which the second data are to be read, among the second physical blocks,
wherein the read controller is configured to determine the target physical block by referring to the read management table and to edit the read management table such that the read management table comprises information indicating an updated target physical block, when the read controller reads the second data.

3. The apparatus according to claim 1, wherein the number of the second physical blocks is $N_2$ times as much as the number of the first physical blocks, when the second data are read $N_2$ times as frequently as the first data.

4. An information processing apparatus comprising:
a processor;
a storage device comprising a plurality of pages and configured to store first data in first pages among the plurality of pages and store second data in second pages among the plurality of pages, wherein the second data are read from the storage device more frequently than the first data, and the number of the second pages is larger than the number of the first pages; and
a read controller configured to sequentially read the second data from each of the second pages of the storage device and to send the second data to the processor, wherein the read controller reads the second data evenly in terms of number of times the second date is read from each of the second pages, when the read controller reads the second data $N_3$ times as many as the number of the second pages, where $N_3$ is a positive integer.

5. A semiconductor storage device comprising:
a main body;
a storage device comprising a plurality of physical blocks and configured to store first data in first physical blocks among the plurality of physical blocks and to store second data in second physical blocks among the plurality of physical blocks, wherein the second data are read from the storage device more frequently than the first data, and the number of the second physical blocks is larger than the number of the first physical blocks;
a receiver configured to receive an instruction to read the second data from the storage device, from an electronic device other than the main body;
a read controller configured to execute the instruction received by the receiver, and to sequentially read the second data from each of the second physical blocks of the storage device, wherein the read controller reads the second data evenly in terms of number of times the second data is read from each of the second physical blocks, when the instruction to read the second data from the storage device is executed by the read controller N times as many as the number of the second physical blocks, where N is a positive integer; and
a transmitter configured to send the second data read by the read controller to the electronic device.

6. The semiconductor storage device according to claim 5, further comprising:
a read management table which contains information indicating a target physical block from which the second data are to be read, among the second physical blocks,
wherein the read controller is configured to determine the target physical block by referring to the read management table and to edit the read management table such that the read management table comprises information indicating an updated read target physical block, when the instruction to read the second data from the storage device is executed by the read controller.

7. The semiconductor storage device according to claim 5, wherein the number of the second physical blocks is $N_3$ times as large as the number of the first physical blocks, when the second data are read $N_3$ times as frequently as the first data.

* * * * *